United States Patent
Shiomi et al.

(10) Patent No.: US 6,337,652 B1
(45) Date of Patent: Jan. 8, 2002

(54) SSR STATION AND AIRCRAFT SECONDARY SURVEILLANCE NETWORK

(75) Inventors: Kakuichi Shiomi, Kokubunji; Masami Ino, Tama; Kiyomi Imamiya, Kawasaki, all of (JP)

(73) Assignees: Electronic Navigation Research Institute, Chofu; Kabushiki Kaisha Toshiba, Kawasaki, both of (JP)

( * ) Notice: Subject to any disclaimer, the term of this patent is extended or adjusted under 35 U.S.C. 154(b) by 0 days.

(21) Appl. No.: 09/609,174

(22) Filed: Jun. 30, 2000

Related U.S. Application Data

(63) Continuation of application No. PCT/JP99/06027, filed on Oct. 29, 1999.

(30) Foreign Application Priority Data

Oct. 30, 1998  (JP) .......................................... 10-311392

(51) Int. Cl.[7] .......................... G01S 13/87; G01S 7/292
(52) U.S. Cl. .......................................... 342/37; 342/40
(58) Field of Search ............................. 342/29, 30, 31, 342/32, 33, 36, 37, 38, 39, 40, 46

(56) References Cited

U.S. PATENT DOCUMENTS

| | | |
|---|---|---|
| 5,077,673 A | 12/1991 | Brodegard et al. ......... 364/461 |
| 5,140,328 A | 8/1992 | Litchford et al. ............. 342/37 |
| 5,179,384 A | 1/1993 | De Haan ...................... 342/37 |
| 5,220,329 A * | 6/1993 | Verbeke, Jr. et al. ......... 342/40 |
| 5,835,059 A * | 6/1993 | Nadel et al. ................. 342/398 |
| 5,619,206 A * | 4/1997 | Cole, Jr. et al. ............. 342/37 |

FOREIGN PATENT DOCUMENTS

| | | |
|---|---|---|
| JP | 61-501727 | 4/1986 |
| JP | 61-256272 | 11/1986 |
| JP | 63-27781 | 2/1988 |
| JP | 2-500390 | 2/1990 |
| JP | 8-105966 | 4/1996 |
| JP | 9-5431 | 1/1997 |
| JP | 9-288175 | 11/1997 |

OTHER PUBLICATIONS

International Search Report.

* cited by examiner

*Primary Examiner*—John B. Sotomayor
(74) *Attorney, Agent, or Firm*—Oblon, Spivak, McClelland, Maier & Neustadt, P.C.

(57) ABSTRACT

An SSR reply, which is sent out from an aircraft, is received and separated into one SSR reply to one SSR station and the other SSR reply to the other SSR station, thereby generating aircraft information of the aircraft based on one of the one SSR reply and the other SSR reply.

5 Claims, 5 Drawing Sheets

SSR STATION AND AIRCRAFT SECONDARY SURVEILLANCE NETWORK

CROSS REFERENCE TO RELATED APPLICATIONS

This is a continuation of Application No. PCT/JP99/06027, filed Oct. 29, 1999.

This application is based upon and claims the benefit of priority from the prior Japanese Patent Application No. 10-311392, filed Oct. 30, 1998, the entire contents of which are incorporated herein by reference.

BACKGROUND OF THE INVENTION

The present invention relates to an SSR (Secondary Surveillance Radar) station for acquiring aircraft information of an aircraft in flight and an aircraft secondary surveillance network.

As is well known, an aircraft in airborne is obliged to send out a desired SSR reply via a transponder when it receives an SSR interrogation from each of SSR stations located in many places. For example, as shown in FIG. 4, such an SSR station sends out its own SSR interrogation to an aircraft 1 with determined interrogation timing and acquires aircraft information such as a position of the aircraft 1 upon receipt of its own SSR reply from the aircraft 1.

Such SSR stations are located in many places. If one SSR station sends out an SSR interrogation to the aircraft 1 and the other SSR station in each of the places acquires aircraft information, a phenomenon called fruit occurs in which the former SSR station receives the other SSR reply which is issued from the aircraft 1 in response to the SSR interrogation of the latter SSR station.

A conventional SSR station has therefore a so-called defruiter function of eliminating fruit and adopts a method of eliminating an undesired other SSR reply. In other words, as shown in FIG. 5, the defruiter function is fulfilled so as to eliminate the other reply as an undesired reply considering one SSR reply, which coincides with interrogation timing t1 of one SSR interrogation, to be effective.

In the above-described SSR station, however, when one SSR reply from the aircraft 1 and the other SSR reply to the other SSR station are synchronized with each other, defruiter processing for eliminating the fruit becomes difficult and high-accuracy aircraft information is likely to become difficult to obtain.

As described above, the conventional SSR station has a problem of making defruiter processing difficult when the other SSR reply transmitted to the other SSR station from an aircraft is synchronized with the received one SSR reply.

The present invention has been developed in consideration of the above situation. One object is of the present invention is to provide an SSR station which is capable of improving in defruiter processing performance and stably acquiring aircraft information with simple construction.

Another object of the present invention is to compensate a loss of one SSR reply by separating the other SSR reply and achieve higher-precision angle measurement by both the one SSR reply and other SSR reply, thereby handling an increase in the number of aircrafts.

Still another object of the present invention is to provide an aircraft secondary surveillance network capable of monitoring an aircraft simply and easily.

BRIEF SUMMARY OF THE INVENTION

According to one aspect of the present invention, there is provided an SSR station comprising interrogation transmission means for transmitting an SSR interrogation to an aircraft, reply reception means for receiving an SSR reply which is transmitted from the aircraft in response to the SSR interrogation, extraction means for processing the SSR reply received by the reply reception means, separating the SSR reply from the aircraft into one SSR reply and other SSR reply, and extracting both the one SSR reply and the other SSR reply, and means for generating aircraft information of the aircraft based on one of the one SSR reply and the other SSR reply extracted from the SSR reply from the aircraft.

The SSR station with the above configuration, using the extraction means, separates a received SSR reply into one SSR reply and the other SSR reply and extracts these relies. The SSR station generates aircraft information of an aircraft on the basis of one of the extracted replies.

Consequently even when the one SSR reply and the other SSR reply are received in a fruit state where they are synchronized with each other, the SSR station can stably acquire reliable, accurate aircraft information by reliable defruiter processing.

According to another aspect of the present invention, there is provided an aircraft secondary surveillance network comprising a plurality of SSR stations for transmitting an SSR interrogation to an aircraft, receiving an SSR reply which is transmitted from the aircraft in response to the SSR interrogation, processing the received SSR reply, separating the SSR reply from the aircraft into one SSR reply and other SSR reply, and extracting both the one SSR reply and the other SSR reply, and generating aircraft information of the aircraft based on at least one of the extracted one SSR reply and other SSR reply, and an information communication network into which the plurality of SSR stations are selectively incorporated, for communicating information between the plurality of SSR stations.

The SSR station with the foregoing configuration separates an SSR reply, which is received by itself, into one SSR reply and the other SSR reply and extracts these replies. The SSR station generates aircraft information of an aircraft based on one of the extracted one SSR reply and other SSR reply and exchange information with the other SSR station through the information communication network.

Consequently even when the one SSR reply and the other SSR reply are received in a fruit state where they are synchronized with each other, the SSR station can stably acquire reliable, accurate aircraft information by reliable defruiter processing and generate desired aircraft information upon receipt of information from another SSR station.

According to still another aspect of the present invention, there is provided an aircraft secondary surveillance network comprising an SSR station for transmitting an SSR interrogation to an aircraft, receiving an SSR reply which is transmitted from the aircraft in response to the SSR interrogation, processing the received SSR reply, separating the SSR reply from the aircraft into one SSR reply and other SSR reply, and extracting both the one SSR reply and the other SSR reply, and generating aircraft information of the aircraft based on at least one of the extracted one SSR reply and other SSR reply, a passive SSR station for intercepting an SSR reply which is issued from an aircraft in response to an SSR interrogation transmitted to the aircraft from the SSR station, and generating and monitoring aircraft information of the aircraft, and an information communication network into which the SSR station and the passive SSR station are selectively incorporated, for communicating information between the SSR station and the passive SSR station.

The plural SSR stations having the above-described configuration each separate an SSR reply, which is received by itself, into one SSR reply and the other SSR reply and extract these replies. The SSR stations generate aircraft information of an aircraft based on one of the extracted one SSR reply and other SSR reply and exchange information with the other SSR station via the information communication network. Upon receiving an SSR reply which is issued from an aircraft in response to an SSR interrogation signal transmitted from at least an SSR station to the aircraft, the plural passive SSR stations can generate and monitor aircraft information of the aircraft and exchange information with the SSR station and another passive SSR station through the information communication network.

Consequently even when the one SSR reply and the other SSR reply are received in a fruit state where they are synchronized with each other, the SSR stations can stably acquire reliable, accurate aircraft information by reliable defruiter processing and generate desired aircraft information upon receipt of information from another SSR station and a passive SSR station. The passive SSR stations can receive information from another SSR station and another passive SSR station and monitor desired aircraft information based on the received information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter an embodiment of the present invention will be described in detail with reference to the drawings.

Figure 1:
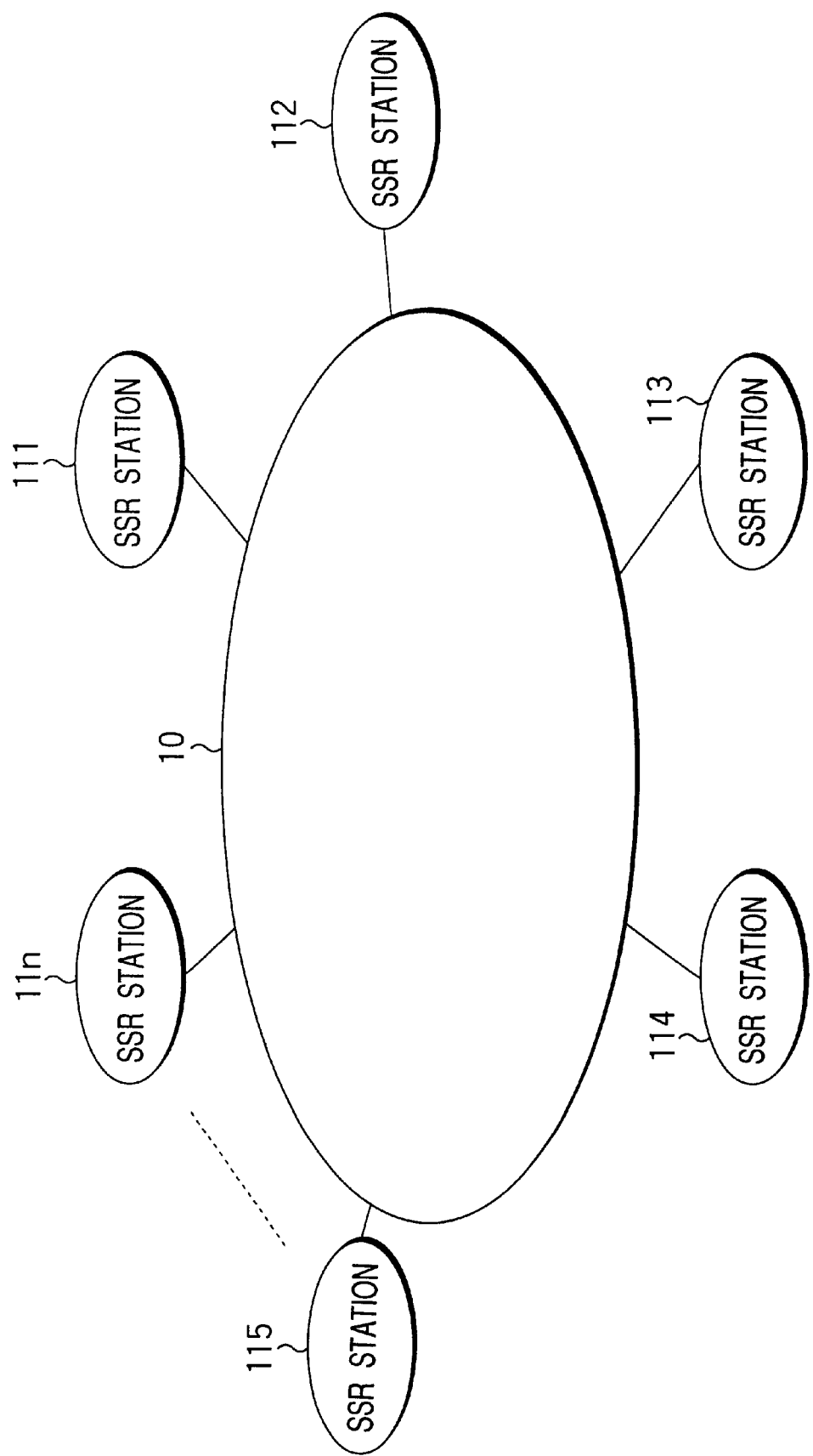
FIG. 1 is a configuration diagram illustrating an aircraft secondary surveillance network according to one embodiment of the present invention.

FIG. 1 illustrates an aircraft secondary surveillance network according to one embodiment of the present invention. A plurality of SSR stations $111, 112, \ldots, 11n$ according to the present invention are selectively incorporated into an information communication network 10 so as to allow information to be communicated among them. The plurality of SSR stations $111, 112, \ldots, 11n$ incorporated into the information communication network 10 each carry out communications of their required timing information and aircraft information via the information communication network 10, and make use of information of other SSR stations $111, 112, \ldots, 11n$.

Figure 2:
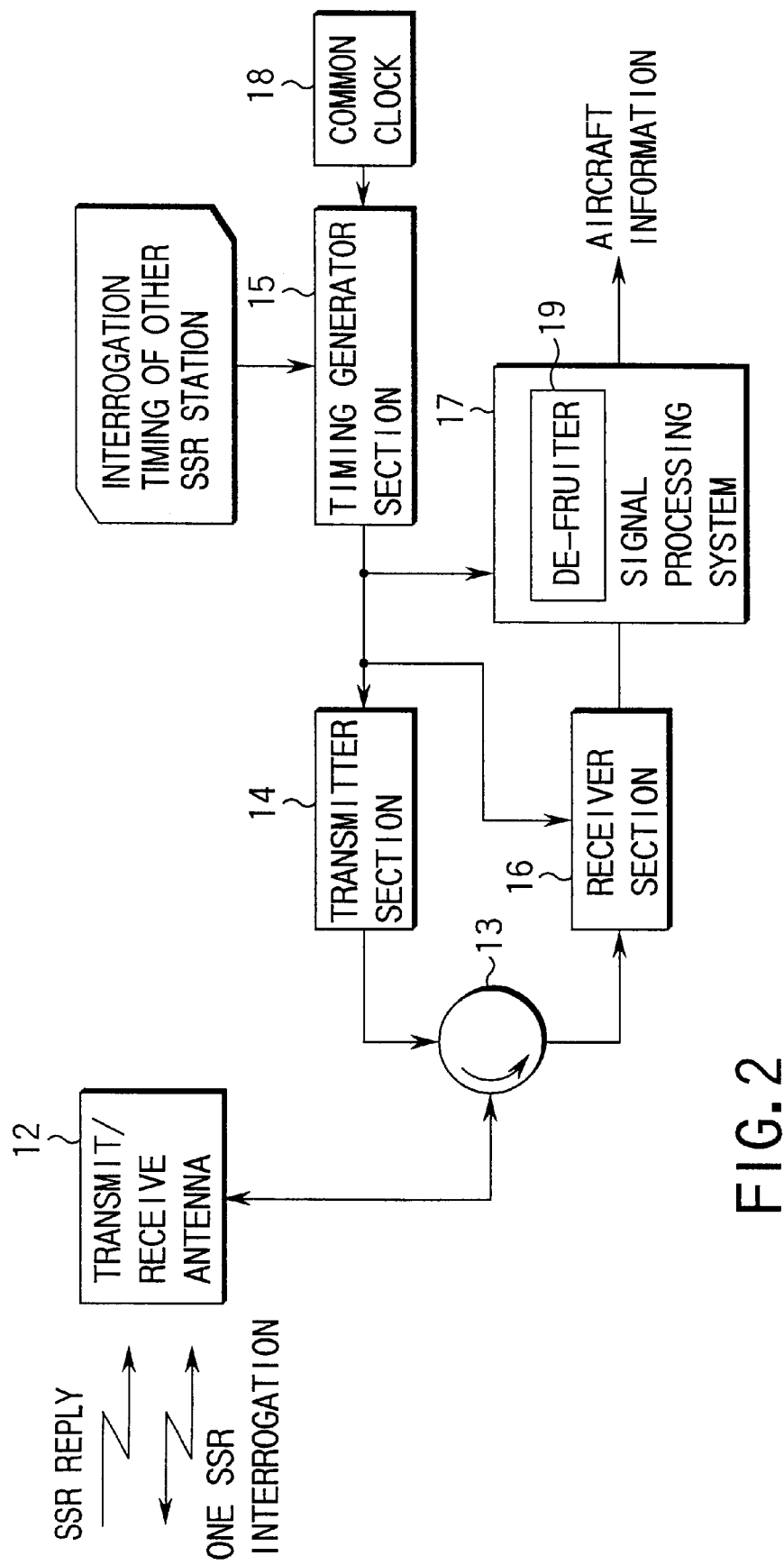
FIG. 2 is a block diagram showing a configuration of an SSR station according to the one embodiment of the present invention.
Figure 4:
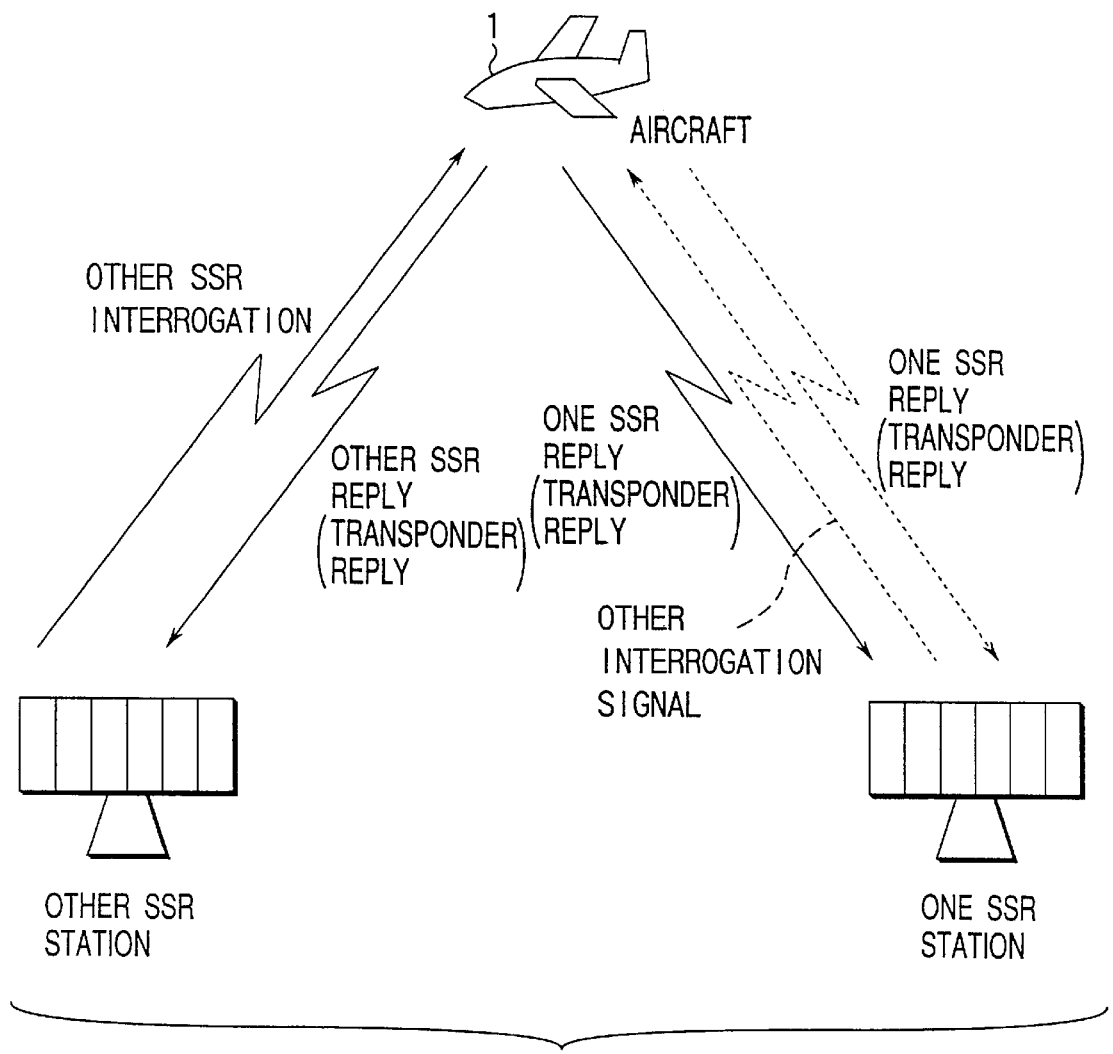
FIG. 4 is a layout configuration diagram for explaining fruit of SSR stations according to the present invention.
Figure 5:
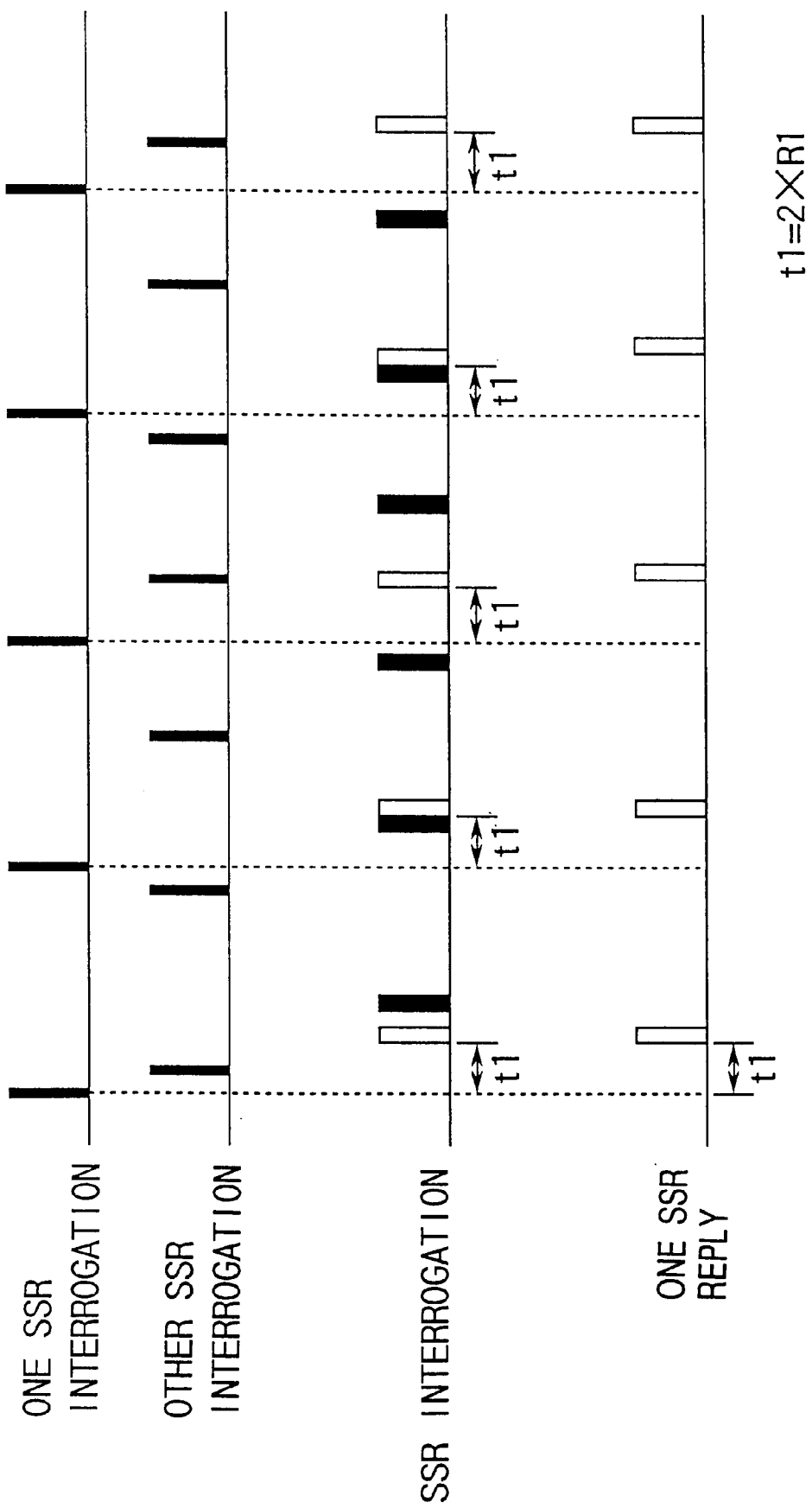
FIG. 5 is a chart of waveforms for explaining a problem of a prior art SSR station.

In the above SSR stations $111, 112, \ldots, 11n$, as shown diagrammatically in FIG. 2, an input/output terminal of a circulator 13 is connected to a transmit/receive antenna 12 which is scanned by rotation in a predetermined cycle. A transmitter section 14 is connected to the input terminal of the circulator 13, and a timing generator section 15 is connected to the transmitter section 14. The timing generator section 15 generates interrogation timing of one SSR interrogation and supplies it to the transmitter section 14. The transmitter section 14 supplies the one interrogation to the circulator 13 and transmit/receive antenna 12 based on the input interrogation timing, and sends it out to an aircraft 1 (see FIG. 4).

A receiver section 16 is connected to the output terminal of the above circulator 13, and a signal processing system 17 is connected to the receiver section 16. The output terminal of the above timing generator section 15 is connected to the receiver section 16 and signal processing system 17.

Assuming here that the SSR station 111 is one SSR station, its timing generator section 15 acquires and stores interrogation timing of another SSR station $112 (113, \ldots, 11n)$, based on time data of a common clock such as the GPS (Global Positioning System), through the foregoing information communication network 10.

The output terminal of a common clock 18 such as the GPS (Global Positioning System) is connected to the timing generator section 15. The section 15 generates interrogation timing of another SSR interrogation and that of one SSR interrogation based on the common clock 18, and supplies them to a defruiter 19 of the signal processing system 17. The timing generator section 15 also generates reception timing of one SSR reply and supplies it to the receiver section 16 to control the reception timing of the receiver section 16.

In the configuration described above, the transmitter section 14 sends out one SSR interrogation to the aircraft 1 in response to the interrogation timing generated from the timing generation section 15, and receives one SSR reply from the aircraft 1. The transmit/receive antenna 12 receives the one SSR reply and another SSR reply, which is issued to the other SSR station $112 (113, \ldots, 11n)$, and supplies them to the circulator 13. The circulator 13 sends the one SSR reply and the other SSR reply to the receiver section 16. The receiver section 16 supplies the input one SSR reply and the other SSR reply to the signal processing system 17.

Figure 3:
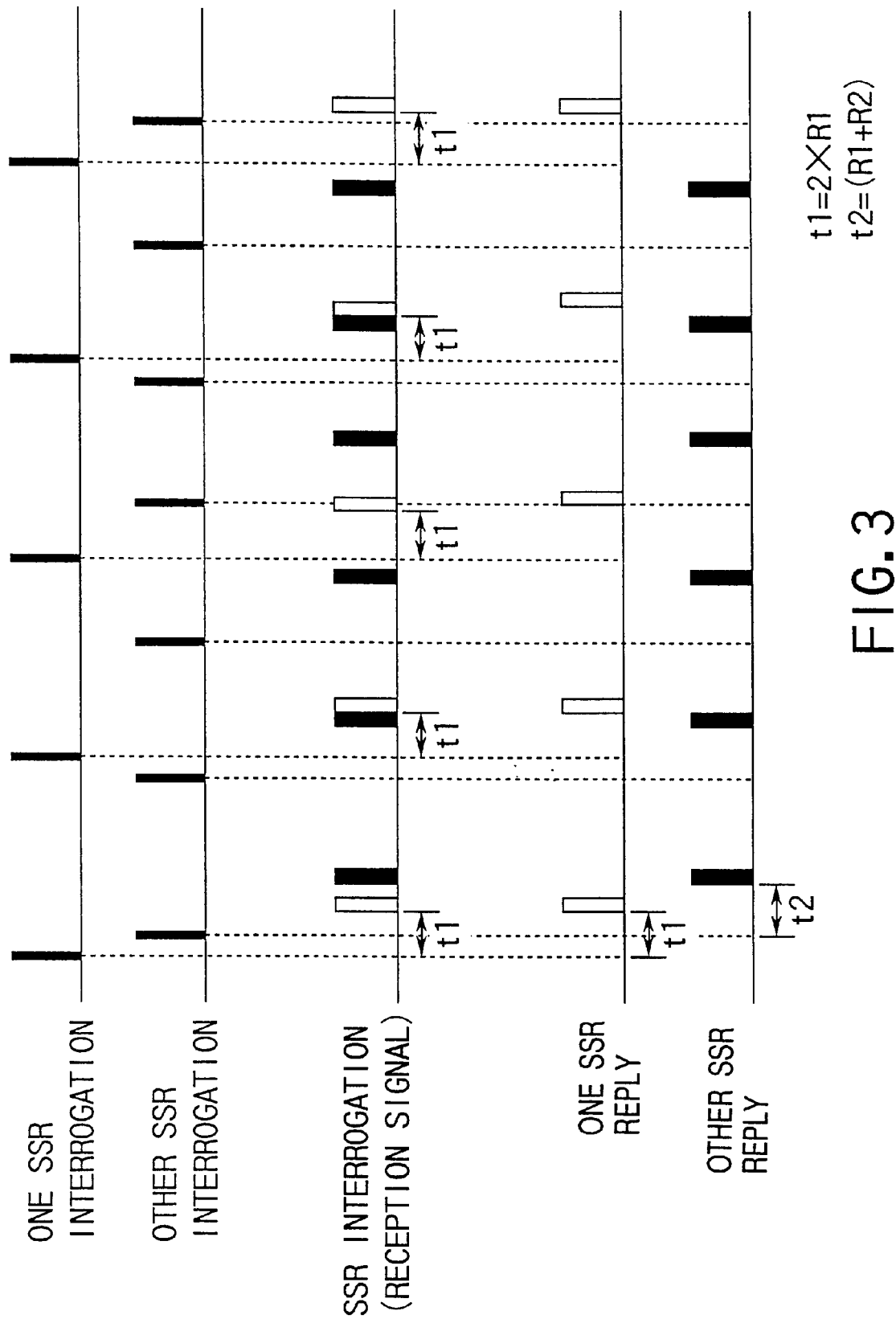
FIG. 3 is a chart of waveforms showing one SSR reply and another SSR reply received by the SSR station shown in FIG. 2.

The defruiter 19 of the signal processing system 17 separates and extracts the one SSR reply and the other SSR signal based on interrogation timings t1 and t2 generated from the timing generation section 15 as shown in FIG. 3, and detects aircraft information based on the one SSR reply and the above one SSR interrogation.

Assuming here that a distance from the one SSR station 111 to the aircraft 1 is R1 and a distance from the other SSR station $112 (113, \ldots, 11n)$ to the aircraft 1 is R2, t1 is equal to 2×R1 and t2 is equal to R1+R2.

When the one SSR reply is a missing (lost) one, the signal processing system 17 generates aircraft information using the other SSR reply separated and extracted by the de-fruiter 19 (see FIG. 3). Even when the transmitter section 14 for transmitting the one SSR interrogation is stopped, the system 17 generates aircraft information based on the other SSR reply separated and extracted by the defruiter 19 and the interrogation timing of the other SSR interrogation.

Moreover, the signal processing system 17 predicts the occurrence of fruit in which one reply and another SSR reply are superposed on each other, based on the interrogation timing of the other SSR interrogation, controls the timing generation section 15 based on the predicted information, and controls rotation timing of the transmit/receive antenna 12, thereby preventing the fruit from occurring.

The foregoing SSR stations are so constituted as to receive an SSR reply from the aircraft 1, separate and extract one SSR reply to the one SSR station 111 and another SSR reply to another SSR station 112 (113, . . . , 11n) from the SSR reply, and generate aircraft information of the aircraft 1 based on one of the extracted one SSR and other SSR replies.

Even when a signal is received in a fruit state where the one SSR reply and the other SSR SR reply are synchronized with each other, defruiter processing is realized to reliably eliminate the fruit, and high-reliability, high-precision aircraft information can stably be obtained.

Since another SSR reply is sent to the other SSR station separated by the defruiter processing, the missing (lost) one SSR reply can be compensated.

When both one SSR reply and the other SSR reply to the other SSR station 112 (113, . . . , 11n) are detected, angle measurement can be improved in accuracy by determining an intersection point of azimuth direction scanning widths obtained from the plurality of SSR stations 111, 112, 113, . . . , 11n for one aircraft 1. One SSR station 111 (112, 113, . . . , 11n) receives several SSR replies, as one scanning for one aircraft 1, per rotation of an antenna or per period of a radio wave emitting schedule. The several SSR replies are arranged at intervals in the azimuth direction on the circumferences of circles whose centers correspond to the SSR stations 111, 112, 113, . . . , 11n and whose radii correspond to a slant range. Since the SSR replies from the plurality of SSR stations 111, 112, 113, . . . , 11n are present on their respective circumferences, higher angle measurement accuracy can be achieved by detecting a position of the aircraft 1 from the intersection point of the azimuth direction scanning widths. The improvement in angle measurement accuracy allows information processing with increase in aircrafts.

The foregoing aircraft secondary surveillance network is configured as follows. SSR replies, which are sent out from the aircraft 1, are received and separated into one SSR reply to the one SSR station 111 and another SSR reply to another SSR station 112 (113, . . . , 11n). The plurality of SSR stations 111, 112, 113, . . . , 1n, which generate aircraft information of the aircraft 1 based on one of the one SSR reply and the other SSR reply, are selectively incorporated into the information communication network 10 to exchange information between the SSR stations via the information communication network 10.

According to the above configuration, the SSR station 111 separates SSR replies, which are received by itself, into one SSR reply and another SSR reply 112 (113, . . . , 11n), and generates aircraft information of the aircraft 1 based on one of the one SSR reply and the other SSR reply. Consequently even when the one SSR reply and the other SSR reply are received in a fruit state where they are synchronized with each other, reliable, accurate aircraft information can stably be acquired by reliable de-fruit processing.

The information communication network 10 incorporating the plural SSR stations 111, 112, 113, . . . , 11n operates to exchange information such as aircraft information acquired by the plural SSR stations 111, 112, 113, . . . , 11n. Thus, acquired information including the aircraft information among the plurality of SSR stations 111, 112, 113, . . . , 11n can be used effectively.

In the above-described embodiment, one transmit/receive antenna 12 transmits an interrogation and receives a reply. The present invention is not limited to this. An antenna for transmitting an interrogation and an antenna for receiving a reply can be provided separately from each other.

Moreover, in the foregoing embodiment, the received SSR replies are separated into one SSR reply and another SSR reply, and the plural SSR stations 111, 112, 113, . . . , 11n, which generate aircraft information of the aircraft 1 based on one of the one SSR reply and the other SSR reply, are incorporated into the information communication network 10. The present invention is not limited to this. For example, the SSR stations 111, 112, 113, . . . , 11n and a passive SSR station for intercepting an SSR reply from an aircraft 1 in response to an SSR interrogation sent out to the aircraft 1 from the SSR stations 111, 112, 113, . . . , 11n, can selectively be attached to the above communication network 10 to exchange various types of information containing aircraft information between the SSR stations 111, 112, 113, . . . , 11n and the passive SSR station.

Furthermore, in the above embodiment, the SSR stations 111, 112, 113, . . . , 11n are incorporated into the information communication network 10 to exchange information between them. However, the present invention is not limited to this. They can be used alone and, in this case, too, substantially the same effect can be expected.

Consequently the present invention is not limited to the above embodiment. It is needless to say that various changes and modifications can be made without departing from the scope of the subject matter of the present invention.

As described above in detail, the present invention can provide an SSR station which is capable of improving in defruiter processing performance and stably acquiring aircraft information with simple construction.

According to the present invention, a loss of one SSR reply can be compensated by separating the other SSR reply, and higher-precision angle measurement can be achieved by both the SSR reply and other SSR reply, thereby handling an increase in the number of aircrafts.

Moreover, the present invention can provide an aircraft secondary surveillance network capable of monitoring an aircraft simply and easily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An SSR station comprising:
   interrogation transmission means for transmitting an SSR interrogation to an aircraft;
   reply reception means for receiving an SSR reply which is transmitted from the aircraft in response to the SSR interrogation;
   extraction means for processing the SSR reply received by the reply reception means, separating the SSR reply from the aircraft into one SSR reply and other SSR reply, and extracting both the one SSR reply and the other SSR reply; and means for generating aircraft information of the aircraft based on one of the one SSR reply and the other SSR reply extracted from the SSR reply from the aircraft.

2. The SSR station according to claim 1, wherein the separation means stores position information of another SSR station, obtains other SSR interrogation timing from the other SSR station based on the position information and time of a common clock to extract the other SSR reply based on the other SSR interrogation timing and the one SSR reply based on one SSR interrogation repetitive cycle.

3. The SSR station according to one of claims 1 and 2, further comprising transmission timing control means for controlling transmission timing of the interrogation transmission means based on the one SSR reply and the other SSR reply extracted by the extraction means.

4. An aircraft secondary surveillance network comprising:

a plurality of SSR stations for transmitting an SSR interrogation to an aircraft, receiving an SSR reply which is transmitted from the aircraft in response to the SSR interrogation, processing the received SSR reply, separating the SSR reply from the aircraft into one SSR reply and other SSR reply, and extracting both the one SSR reply and the other SSR reply, and generating aircraft information of the aircraft based on at least one of the extracted one SSR reply and other SSR reply; and an information communication network into which the plurality of SSR stations are selectively incorporated, for communicating information between the plurality of SSR stations.

5. An aircraft secondary surveillance network comprising:

an SSR station for transmitting an SSR interrogation to an aircraft, receiving an SSR reply which is transmitted from the aircraft in response to the SSR interrogation, processing the received SSR reply, separating the SSR reply from the aircraft into one SSR reply and other SSR reply, and extracting both the one SSR reply and the other SSR reply, and generating aircraft information of the aircraft based on at least one of the extracted one SSR reply and other SSR reply;

a passive SSR station for intercepting an SSR reply which is issued from an aircraft in response to an SSR interrogation transmitted to the aircraft from the SSR station, and generating and monitoring aircraft information of the aircraft; and an information communication network into which the SSR station and the passive SSR station are selectively incorporated, for communicating information between the SSR station and the passive SSR station.

* * * * *